United States Patent [19]
Gregor

[11] Patent Number: 5,450,563
[45] Date of Patent: Sep. 12, 1995

[54] STORAGE PROTECTION KEYS IN TWO LEVEL CACHE SYSTEM

[75] Inventor: Steven L. Gregor, Endicott, N.Y.

[73] Assignee: International Business Machines Corporation, Armonk, N.Y.

[21] Appl. No.: 968,767

[22] Filed: Oct. 30, 1992

[51] Int. Cl.⁶ .................... G06F 12/08; G06F 12/00
[52] U.S. Cl. .................... 395/403; 395/445; 364/DIG. 1
[58] Field of Search ............. 395/425, 325, 800, 400; 364/DIG. 1

[56] References Cited

U.S. PATENT DOCUMENTS

| | | | |
|---|---|---|---|
| 3,761,883 | 9/1973 | Alvarez et al. | 395/425 |
| 4,136,386 | 1/1979 | Annunziata et al. | 395/425 |
| 4,293,910 | 10/1981 | Flusche et al. | 395/425 |
| 4,349,871 | 9/1982 | Lary | 395/800 |
| 4,422,145 | 12/1983 | Sacco et al. | 395/650 |
| 4,589,092 | 5/1986 | Matick | 395/425 |
| 4,719,568 | 1/1988 | Carrubba et al. | 395/425 |
| 4,977,498 | 12/1990 | Rastegar et al. | 395/425 |
| 5,276,848 | 1/1994 | Gallagher et al. | 395/425 |
| 5,283,886 | 2/1994 | Nishii et al. | 395/425 |

OTHER PUBLICATIONS

IBM TDB vol. 31, No. 2, pp. 109–111, Jul., 1988, "Storage Key Cache Proposal", by Junod.

*Primary Examiner*—David L. Robertson
*Assistant Examiner*—Sheela Nadig
*Attorney, Agent, or Firm*—Arthur J. Samodovitz

[57] ABSTRACT

The cache system comprises a level one (L1) data cache, a level one (L1) key cache for storing a plurality of access keys for respective pages or blocks of data referenced by the central processor. A level three (L3) storage stores the data requested by the central processor and an access key array including the plurality of access keys. A level two (L2) data cache is coupled between the L3 storage and the L1 data cache and stores a copy of data fetched from the L3 storage for the L1 data cache pursuant to a read request and data written by the central processor. The level two (L2) key cache is coupled between the L3 storage access key array and the L1 key cache and stores the plurality of access keys for respective pages or blocks of data in the L2 data cache. The general strategy of the cache system is to copy the access key corresponding to each central processor request into the L1 key cache the first time that any page of data is inpaged pursuant to a read or write request, so that the access key is readily available to the central processor for the current and subsequent requests. If the central processor request is to store data to the L2 data cache, the corresponding access key but not the data is copied into the L1 level, and the data is updated only in the L2 data cache, assuming that the data did not reside in the L1 data cache due to a previous read request.

18 Claims, 4 Drawing Sheets

STORAGE PROTECTION KEYS IN TWO LEVEL CACHE SYSTEM

BACKGROUND OF THE INVENTION

The invention relates generally to computer systems, and deals more particularly with manipulation of storage protection keys within a two level cache system. The keys are used to regulate access to associated pages of main memory.

Most computer systems include a main memory and a cache system to expedite access to main memory data. A typical cache system comprises a data cache to store data fetched from or written to main memory, and a directory to store "absolute" addresses of the data copied into the data cache. The absolute addresses are the actual main memory addresses. The processor can access the data cache faster than the main memory because the data cache is smaller than the main memory, located closer to the processor than the main memory, and usually formed from faster but more expensive technology. An effective caching strategy relies on spatial and temporal locality of reference, i.e. the data likely to be needed next by the processor is stored in the main memory near the data currently requested. This is true, for example, when the processor requests to sequentially read a file and the words of the file are stored in successive locations in main memory. Therefore, when the processor requests data, typically four or eight bytes per access, this data along with the remainder of the cache block (typically 64, 128 or 256 bytes of contiguous addresses) are fetched from main memory and loaded into the data cache. The cost of accessing the relatively remote main memory is amortized over the return of a larger than requested block of data, relying on locality of reference to make effective use of the additional data for subsequent requests.

A hierarchical two level cache system is also known which comprises a plurality of level one (L1) data caches and respective directories, which each serve one processor, and a level two (L2) data cache and associated directory which are coupled to and serve all the L1 caches. The L2 data cache is also coupled to the main memory, retains a copy of all data requested or updated by any of the processors, and serves as a conduit for transferring data from main memory to the L1 cache of the processor which requests the data. When any processor modifies data, control hardware associated with the L2 data cache notifies all other L1 caches that their copy of the data, if stored, is now invalid.

In many computer systems, programs executing on a processor identify data by address operands embedded within an instruction. The address operands are quickly converted by hardware to a "virtual" address, a location in the program's linear address space. Then hardware, with support from the operating system, dynamically translates the virtual address to the corresponding absolute address of the location in main memory. The time required to perform the address translation is significant. Therefore, after the translation, the virtual address and the corresponding absolute or relevant portions thereof, along with program-specific control information, are stored in a translation lookaside buffer (TLB) for future reference.

In some previously known computer systems such as the IBM System/390 computers, each program does not have authority to access all of main memory. Instead, access to main memory is controlled by a storage protection key array. The storage protection key array may be stored in or stored separately from main memory, but if stored separately, is usually stored at the same level in the memory system hierarchy as main memory. Each key in the array corresponds to a 4096-byte page of main memory. When the program requests access to a page, the program must also furnish an access key, either from its program status word (PSW) or channel program key, which is then compared to the storage protection key of the addressed page. The storage protection key is composed of an access control field (4-bit value), a fetch-protection bit, a change bit and reference bit. To obtain access, the access key furnished by the program must match or master the key in the access control field. The fetch-protection bit indicates whether fetch accesses are monitored in addition to store accesses for the 4KB page. The reference bit is set whenever a fetch (read) or store (write) access is made to the page, and the change bit is set whenever the page contents are altered by the requested access. The master or privileged key is usually reserved for operating system use so that the operating system (or other bearer) can access any page in main memory regardless of the access key associated with the page.

There are different known techniques for manipulating storage protection keys in a cache system and/or TLB to expedite checking of storage protection keys. As noted-above, fetches of storage protection keys from the array in main memory are time consuming and should be avoided whenever possible to improve performance.

The prior art IBM System/390 computer system includes a two level cache system. A program executing in the system provides address operands to identify data, and then hardware converts the address operands to one or more virtual addresses. Then, the TLB is accessed to determine if the virtual address and corresponding absolute address, access control bits and fetch-protection bit are stored there. If so, the storage protection key can be checked from the TLB. If authorized, the absolute address can then be used to access the requested data from the memory hierarchy. However, if the virtual address is not currently stored in the TLB, then dynamic address translation hardware translates the virtual address to an absolute address. Following the completion of the address translation, the absolute address is used to fetch access control bits and fetch-protection bit from the storage protection key array. Finally, the virtual page address, the translated absolute page address, and the access control bits and fetch-protection bit are loaded into the TLB for the current and subsequent requests. This system provides fast address translation and fast access to the storage protection keys for subsequent requests for the same data. However, for the current request, the fetching of the storage protection key occurs after the address translation step and this delays satisfaction of the current request.

U.S. Pat. No. 3,761,883 discloses a single level cache buffer system. When a block of data is fetched into the local buffer from main memory, the storage protection key associated with that block is also fetched from the storage protection key array and stored into a key array local to the processor. This arrangement permits the key to be readily modified because the key need not be fetched again from main memory.

IBM TDB Volume 31 No.2 July 1988 pages 109–111 discloses a key array at the L2 cache level. If an access results in a miss in the L2 data cache, then the data and storage protection key are simultaneously fetched from main memory and the storage protection key array, respectively. As the main memory data is loaded into the L2 data cache, the storage protection key is loaded into the L2 key array.

A general object of the present invention is to provide storage protection keys in a two level cache with minimal overhead and fast access.

SUMMARY OF THE INVENTION

The invention resides in a two level cache system which stores access keys as well as data. The cache system receives requests from a central processor to read or write data referenced by an address. The cache system comprises a level one (L1) data cache, a level one (L1) key cache for storing a plurality of access keys for respective pages or blocks of data referenced by the central processor, a level two (L2) data cache and a level two (L2) key cache. A level three (L3) storage or main memory stores the data requested by the central processor and an access key array including the plurality of access keys. The level two (L2) data cache is coupled between the L3 storage or main memory and the L1 data cache and stores a copy of data fetched from the L3 storage or main memory for the L1 data cache pursuant to a read request and data written by the central processor. The level two (L2) key cache is coupled between the L3 storage or main memory access key array and the L1 key cache and stores the plurality of access keys for respective pages or blocks of data in the L2 data cache.

The general strategy of the cache system according to the present invention is to copy the access key corresponding to each central processor request into the L1 key cache the first time that any page of data is inpaged pursuant to a read or write request, so that the access key is readily available to the central processor for the current and subsequent requests. If the central processor request is to store through data and the data does not currently reside on the L1 data cache, the corresponding access key but not the data is copied into the L1 level, and the data is updated only in the L2 data cache.

BRIEF DESCRIPTION OF THE FIGURES

FIGS. 2(a,b) form a flow chart which illustrates operation of hardware within the two level cache system of FIG. 1.

DETAILED DESCRIPTION OF THE PREFERRED EMBODIMENTS

Figures 1, 1A:
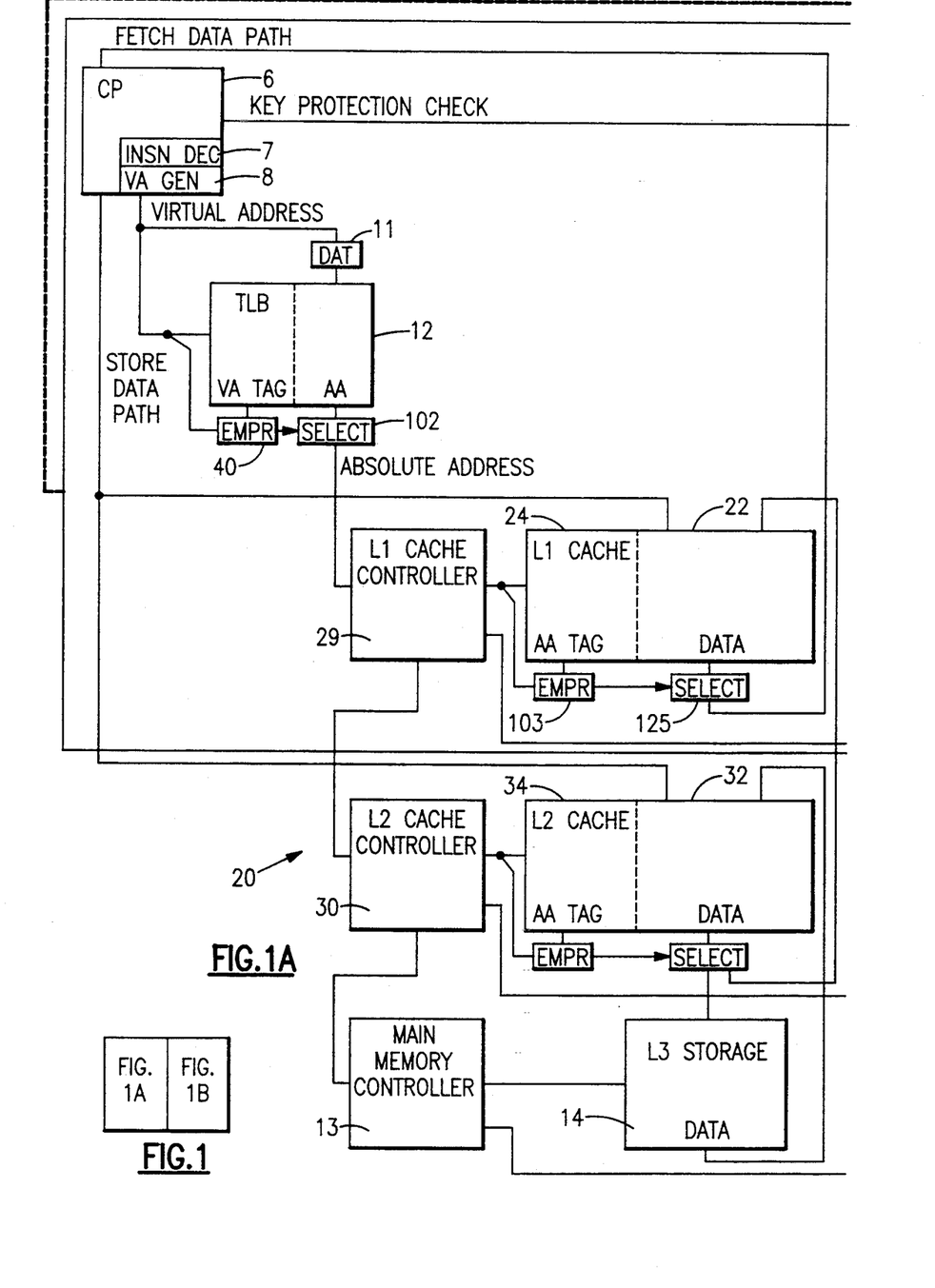
FIG. 1 is a block diagram of a two level cache system including first and second level key caches according to the present invention.
Figure 1B:
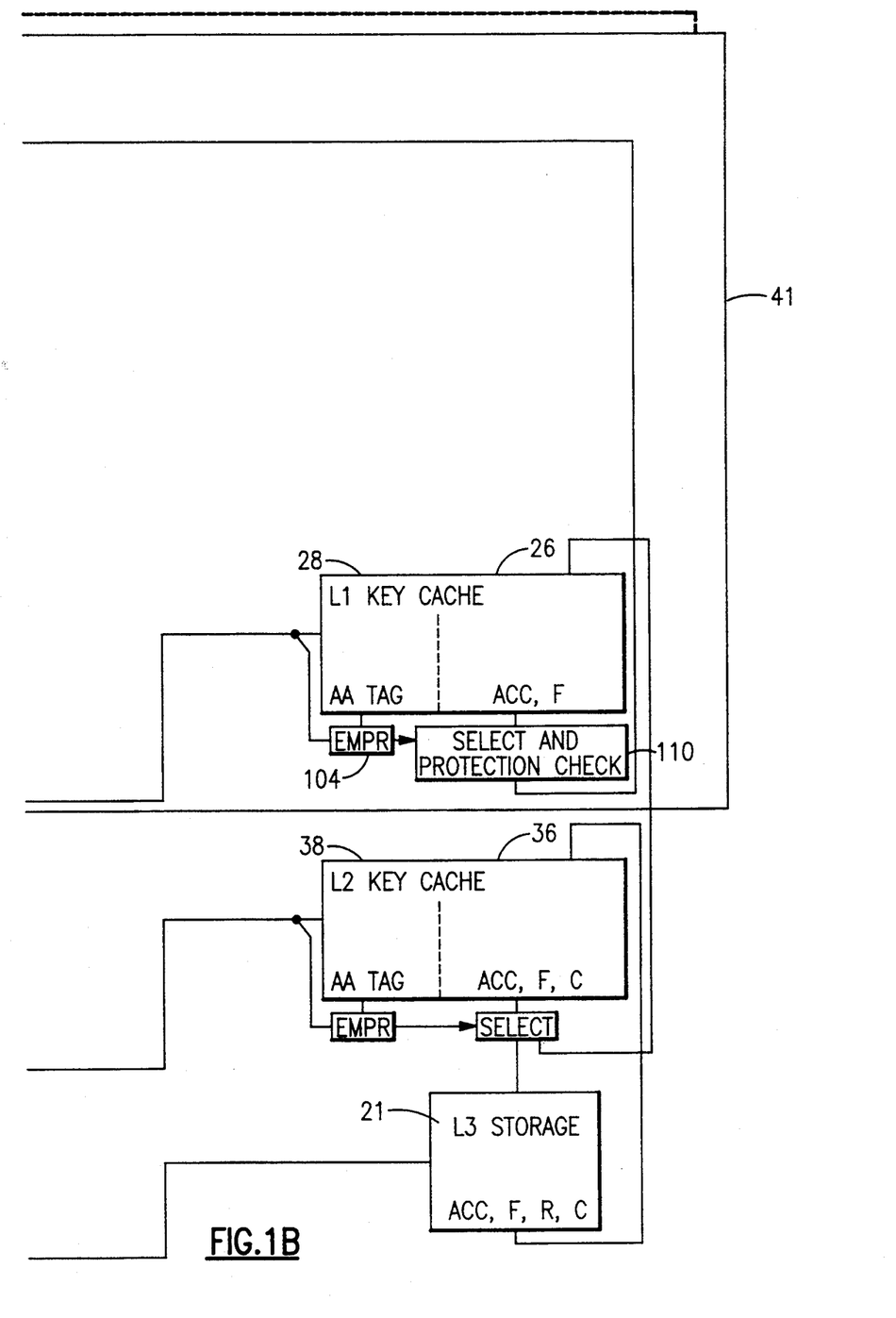

FIG. 1 illustrates a central processor (CP) 6, instruction decode hardware 7, virtual address generation hardware 8, dynamic address translation hardware 11, TLB 12, level three (L3) data storage or main memory 14 including a storage protection key array 21, and a cache system generally designated 20 according to the present invention. The central processor 6, instruction decode hardware 7, virtual address generation hardware 8, dynamic address translation hardware 11 and main memory 14 including storage protection key array 21 can be those used in the prior art IBM System/390 computer system and described in detail in ESA/390 Principles of Operation. This document is available from International Business Machines Corporation at Mechanicsburg, Pa. by order number SA22-7201. The storage protection key array 21 associated with main memory retains a key composed of four access control bits, one fetch-protection bit, one reference bit and one change bit for each 4,096-byte page of data in main memory.

Cache system 20 comprises a level one (L1) data cache 22 with an L1 data directory 24 and an associated L1 key cache 26 with an L1 key directory 28. Cache system 20 also comprises a level two (L2) data cache 32 with an L2 data directory 34 and an associated L2 key cache 36 with an L2 key directory 38. Another L1 data cache with L1 data directory, associated L1 key cache with an L1 key directory, central processor, DAT and TLB identical to those described above are broken line box 39 to illustrate that L2 data cache 32, L2 data directory 34, L2 key cache 36 and L2 key directory 38 serve two, and possibly more, sets of L1 data caches, L1 data directories, L1 key caches, L1 key directories, central processors, DATs and TLBs. With respect to the components represented by broken line box 39, the output from the L1 cache controller is supplied to L2 cache controller 30, the select output from the L2 data cache is supplied to the L1 data cache, and the select output from L2 key cache 36 is supplied as an input to the L1 key cache, in the same manner illustrated by the components within solid box 41 of FIG. 1. The L1 data cache 26 is a store-through cache whereby a store access updates the contents of the L2 data cache 32. The contents of the L1 data cache will also be updated if and only if the data is present in the L1 data cache (from a previous read request). Each of the L1 data caches retains only a subset of the L2 cache data which the associated processor has requested. When a processor updates data in its L1 data cache or the L2 data cache, an L2 cache controller 30 invalidates other copies of the data in the L1 data caches of other processors.

The following is a general description of the operation of the foregoing components. The CP executes a program which requests access to main memory data and identifies the data through address operands. The virtual address generation hardware 8 converts the address operands to a virtual address. Then, the TLB is checked to determine if the TLB currently retains this virtual address. If so, the TLB also contains the corresponding absolute address. If not, the dynamic address translation hardware translates the virtual address to the corresponding absolute address. Then relevant portions of the virtual address and corresponding absolute address are stored in the TLB 12 for the current and subsequent requests. Then, the absolute address in the TLB is used to access the L1 and L2 data caches and directories, key caches and directories, and main memory, including the storage protection key array 21 as described below. Note that the TLB does not require or store the storage protection key so the update of the TLB is not delayed by fetching the storage protection key.

If the foregoing program request was to fetch the data, then the data and storage protection key are fetched from the highest level (L1 defined as the highest, L3 or main memory defined as the lowest) in the memory hierarchy where available, and copied to each higher level until the data is stored in the L1 data cache and the storage protection key is stored in the L1 key cache level, This will require copying the data and key from the L2 level to the L1 level if the data and key are not currently resident in the L1 level but are currently resident in the L2 level, or copying the data and key from the main memory to the L2 level and then to the L1 level, if the data and key were not resident in the L2 level either, In all cases for the fetch access, the storage protection key access control bits and fetch protection bit are moved and stored in parallel with the data from the lower levels to the higher levels in the memory hierarchy, The storage protection key fields are always passed to the L1 key cache with the first required data transfer to facilitate key-controlled protection at the L1 cache level.

Then, the access key from the PSW or channel program key is used to verify access rights to the requested data by comparison with the storage protection key now stored in the L1 key cache. If the access is disallowed, the requested data is not passed to the requester, but instead a program exception for storage protection is returned. This typically results in termination of the program. If the access is allowed, then the data is passed from the L1 data cache to the program executing in the CP or a channel subsystem (not shown).

If the foregoing program request was to store data, then the storage protection key must also be checked from the L1 key cache, and the data must be updated in the L2 data cache, if authorized. This requires that the storage protection key exist within the L1 key cache prior to allowing the store access to continue down the memory hierarchy. In the case of an L1 key cache miss, the storage protection key must be fetched from the highest available level in the memory hierarchy and copied successively into the L1 key cache. This may require fetching the data from the L3 level into the L2 level. The storage protection key and data are moved and stored in parallel upwardly in the memory hierarchy until the L2 level. Then, the storage protection key but not the data is moved and stored into the L1 level. If the requester possesses authority to update the page, then the data is updated in the L2 data cache (and simultaneously in the L1 data cache if and only if the data was previously stored there due to a previous fetch access.) If the requestor does not possess authority to update the page, then the request is disallowed and a programming exception for storage protection is returned to the CP, resulting in termination of the executing program.

As noted above, in the case of an L1 key cache miss, the key must first be fetched from the L2 key cache, if available there, or fetched from the storage protection key array into the L2 cache if not presently available from the L2 key cache and then loaded into the L1 key cache. The transfer of the key from the L2 key cache to the L1 key cache and then to the CP requires the same time as that required to read the key directly from the L2 key cache (or storage protection key array) to the central processor. The reason that the key is first loaded into the L1 key cache and then read by the CP from the L1 key cache and not read directly from the L2 key cache is based on locality of reference as mentioned previously. Subsequent accesses are likely to involve the same page, and the respective storage protection key will then be conveniently available from the L1 key cache. Also, modifications to the storage protection key access control bits and fetch-protection bit are far less likely to occur than changes to the associated 4096 bytes of data so the additional copy in the L1 key cache does not often require an additional modification. Thus, copying the storage protection key into the L1 key cache but not the data into the L1 data cache on store accesses improves overall system efficiency.

For instructions which specifically read or update the contents of the storage protection keys, the request must be sent to the lowest level in the memory hierarchy, the storage protection key array. However, for read accesses, the most recent change bit value is obtained from the L2 key cache, if present, and substituted for the change bit read from the storage protection key array. For update requests, such as an ESA/390 Set Storage Key Extended instruction, inconsistent keys must be avoided in different L1 key caches. Thus, after the update is made to the lowest level in the memory hierarchy, invalidation requests are sent to all L1 key caches and the L2 key cache. This eliminates any inconsistent copies from the system, and the storage protection key array is then updated with the new entry. To avoid use of an inconsistent key by another processor during the update process, the other processors are stalled during the update process.

The following is a more detailed description of one specific example of the foregoing components and their operation, although the present invention can be used in other environments. The program instruction indirectly provides 64-bit base and optional 64-bit index operands and directly provides a 12-bit displacement address operand. The virtual address is calculated from the program instruction, according to the prior art IBM ESA/390 architecture as follows: Computer hardware 8 references a register set based on the base and index address operands to determine corresponding 64-bit base and 64-bit index address components. Then, the base and index address components and the right-justified displacement address operand are added together to yield a 64-bit virtual address. The virtual address specifies a 52-bit page address or page identifier, VA(0:51), and a 12-bit offset, VA(52:63), within the page, bit 0 representing the most significant bit of the addresses. The page offset comprises a 6-bit cache block index, VA(52:57), and a 6-bit byte offset, VA(58:63), into the L1 cache block. Because of the 4KB page, the 12 least significant bits of the virtual address, i.e. the cache block index and the byte offset, are identical to the 12 least significant bits of the absolute address.

Next, the virtual address is looked-up in the TLB as follows. Assuming the TLB has 128 addressable sets of entries, VA(45:51) are used as an index into the TLB, selecting the row read from the TLB where the virtual address and corresponding absolute address may reside. Only VA(0:44), the tag, are saved in the virtual address portion of the TLB. The tag is compared using a circuit 40 against the corresponding bits of the virtual address used to access the TLB. An equal match (TLB hit) and asserted valid entry bit indicate that the virtual address can be quickly translated to an absolute address by a simple reading of the corresponding entry in the TLB, selection hardware 102 gating the corresponding absolute address from the TLB. The 12 least significant bits of the absolute address are not retained in the TLB absolute address field but are obtained from the virtual address supplied by hardware 8.

If the virtual address is not currently stored in the TLB, then the absolute address is obtained from dynamic address translation hardware 11. The dynamic address translation process is well documented in the prior art ESA/390 Principles of Operation. The result of the dynamic address translation is then loaded into the TLB for the current and subsequent accesses. The selection of the replacement entry within the TLB row addressed is least-recently-used and well-known in the prior art.

Figure 2A:
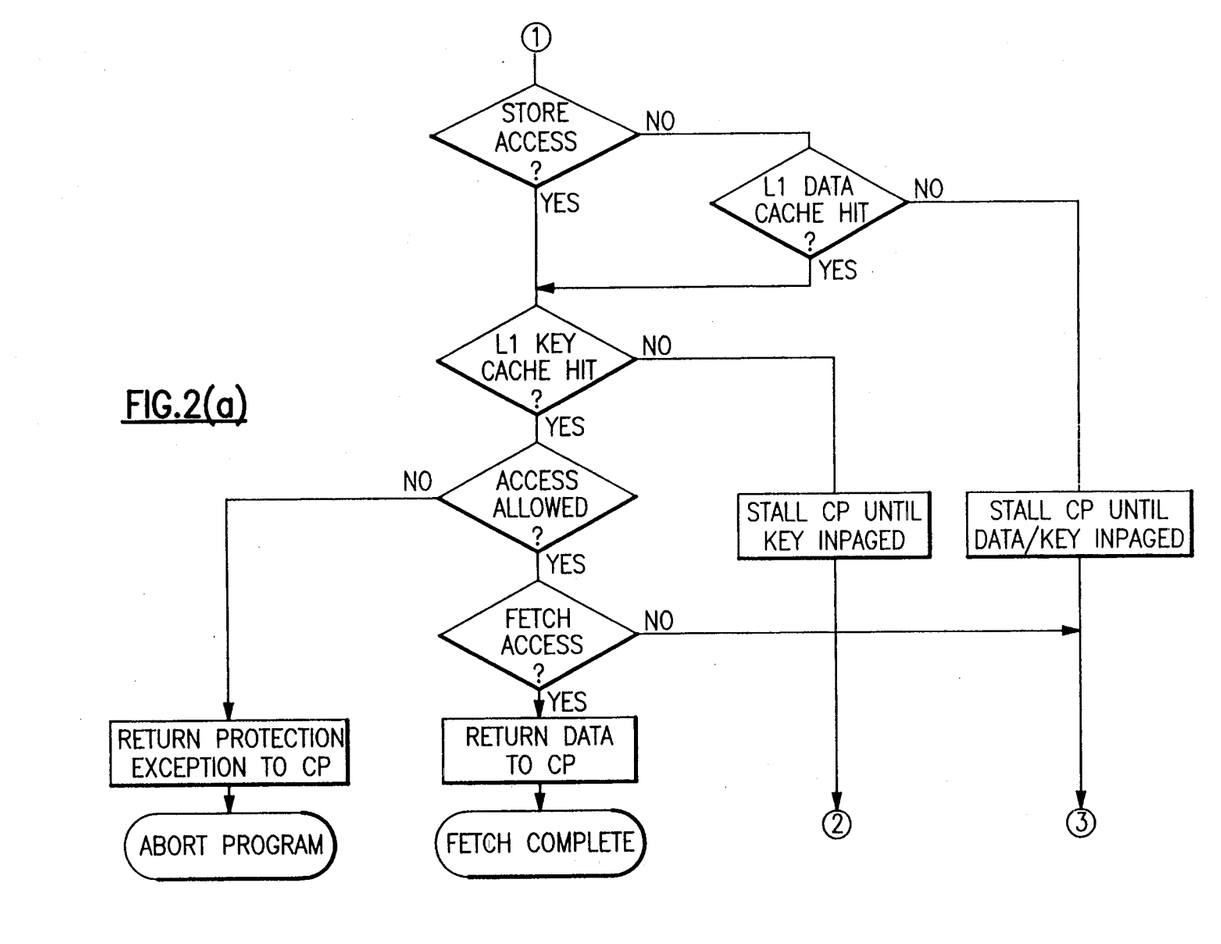
Figure 2B:
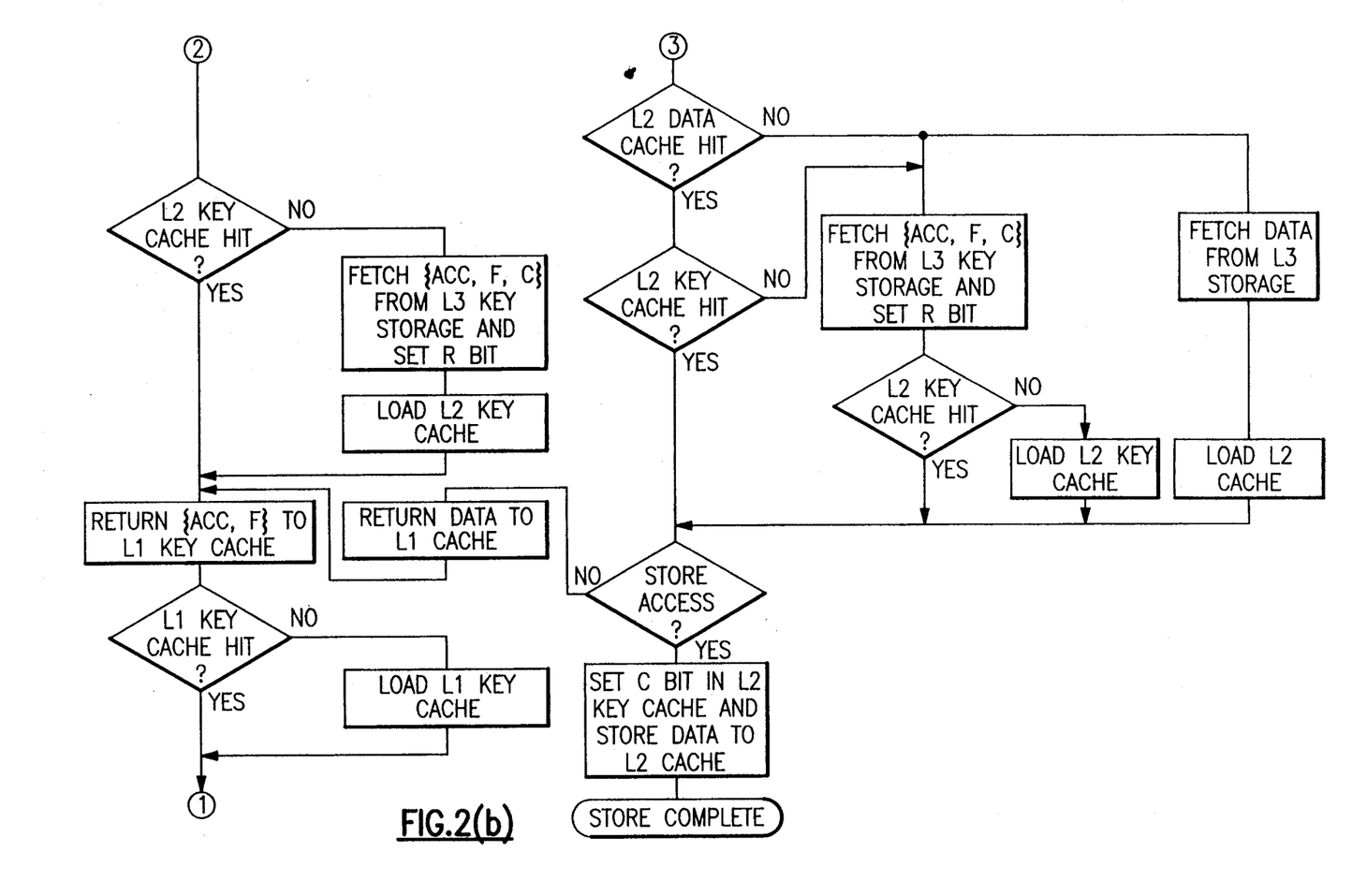

Subsequent operation of the hardware of the present invention is illustrated by the flow chart of FIGS. 2 (a,b). Instruction decoder 7 within central processor 10 determines the nature of the program's request. If the request is to fetch data from a main memory address (decision 100), selection hardware 102 supplies the absolute address from the TLB 12 to an L1 cache controller 29. The L1 cache controller 29 forwards the address onto the L1 data directory 24 and L1 key directory 28 which use respective comparison circuits 103 and 104 to determine if the requested data resides in the L1 data cache (step 105 and decision 106) and the corresponding storage protection key resides in the L1 key cache 26 (step 107 and decision 108). If both conditions are true, then selection and protection check hardware 110 fetches the storage protection key access control bits and fetch-protection bit from the corresponding location in the L1 key cache and compares it to the access-key supplied with the program instruction (step 120). If the request is authorized (decision 122), then because the request is to fetch data (decision 124), selection hardware 125 gates the selected data from the L1 data cache and returns the data to the CP (step 126). However, if the access is not authorized, then the selection and protection check hardware 110 returns an exception condition signal to the central processor (step 123).

Referring again to decision 106, if the data did not reside in the L1 data cache when originally requested, then the comparison circuit 103 signals the CP to wait while the data is fetched from the L2 data cache, or main memory as necessary, and the storage protection key is fetched from the L2 key cache, or the storage protection key array 21, as required (step 136). Next, the L1 cache controller 29 forwards the absolute address and fetch request to the L2 cache controller 30. When the L2 cache controller 30 selects the fetch request for service, it forwards the absolute address to a comparison circuit 138 to compare the absolute address with the contents of the L2 data directory 34 to determine if the data resides in the L2 data cache 32 (decision 142). If the data does not reside in the L2 data cache, then the L2 cache controller 30 sends an inpage request to a main memory controller 13 to fetch the data from main memory (step 150) and the access control bits, fetch- protection bit, and change bit from the storage protection key array 21. The main memory controller 13 sets the reference bit (step 154) as part of the fetch request. When the data and storage protection key fields are returned to the L2 cache controller 30, it loads the data into the L2 data cache (step 152) and updates the L2 data directory with the absolute address. Also, if the fetched storage protection key fields do not currently reside in the L2 key cache (decision 155), then the L2 cache controller SO loads the corresponding fields into the L2 key cache entry selected (156) and updates the L2 key directory with the absolute address. Steps 154 and 156 are performed in parallel with steps 150 and 152. Then, because this is a fetch operation, processing continues with steps 148 and 168 in which the L1 cache controller 29 loads the data from the L2 data cache into the L1 data cache and the access control bits and fetch-protection bit from the L2 key cache into the L1 key cache, as necessary. The L1 cache controller 29 also updates the L1 data directory 34 and L1 key directory with the absolute address supplied with the initial request. If the L1 key cache already contains the access control bits and fetch-protection bit for the addressed page, then the update does not occur. The replacement policy for the L1 key cache can be any known in the prior art. Valid entry bits are assumed as necessary and the appropriate valid entry bit is asserted whenever new information is loaded into an L1 key cache entry.

Referring again to decision 142, if the data did reside in the L2 data cache when originally requested but the required storage protection key fields did not reside in the L2 key cache, then steps 154, 156, and 148 as described above are performed. Referring again to decision 108, if the storage protection key fields did not reside in the L1 key cache but the data resided in the L1 data cache when originally requested, then the comparison hardware 104 signals the CP to wait until the storage protection key fields can be loaded into the L1 key cache (step 160). Then, the L1 cache controller 29 supplies the absolute address to the L2 cache controller 30. When the key fetch request is selected for service, if the required storage protection key fields reside in the L2 key cache (decision 164), then the selection hardware 146 returns the access control bits and fetch-protection bit to the L1 cache controller 29 (step 165). Then the L1 cache controller 29 loads the storage protection key fields into the L1 key cache and the absolute address into the L1 key directory 28 (step 168). However, if the storage protection key does not reside in the L2 key cache when the key-fetch request is serviced, then the request is forwarded to the main memory controller 13 which fetches the storage protection key from the storage protection key array 21 and sets the reference bit (step 170). The access control bits, fetch-protection bit, and change bit are returned to the L2 cache controller SO, which loads the fields into the L2 key cache and the absolute address into the L2 key directory (step 172). In parallel, the L2 cache controller returns the access control bits and fetch-protection bit to the L1 cache controller 29 (step 165). The L1 cache controller 29 updates the the L1 key cache (decision 167) and loads the absolute address into the L1 key directory 28 (step 168) when not already present. The replacement policy for the L2 key cache can be any known in the prior art. Valid entry bits are assumed as necessary and the appropriate valid entry bit is asserted whenever new information is loaded into an L2 key cache entry. As the L2 key cache is managed as a store-in cache, upon replacement of a valid entry, it may be necessary to copy the current change bit state of the addressed storage protection key back to the corresponding entry in the storage protection key array.

Referring again to decision 100, assume the program instruction requests to store data to a location in main memory, i.e. update the existing contents of the corresponding address in the L2 data cache, and L1 data cache if present. Then the selection hardware 102 supplies the absolute address to the L1 cache controller for input to the comparison circuit 104 of the L1 key directory to determine if the storage protection key corresponding to the address to which the data will be written currently resides in the L1 key cache 26 (step 107). If not (decision 108), then steps 160, 165 and 168 are performed to fetch the access control bits and fetch-protection bit from the L2 key cache and load them and the absolute address into the L1 key cache and L1 key directory, respectively, provided the storage protection key is available in the L2 key cache. Note that in this case, the data will not be fetched from the L2 data cache nor loaded into the L1 data cache. However, if the storage protection key is not retained in the L2 key cache, then steps 160, 164, 170, 172, 165 and 168 are performed in which the appropriate fields are first fetched from the storage protection key array 21 and the reference bit is set. Then, the access control bits, fetch-protection bit, change bit are loaded into the L2 key cache 36 and the absolute address is loaded into the L2 key directory. In parallel, the access control bits and fetch-protection bit are transferred to the L1 cache controller to be loaded into the L1 key cache while the absolute address is loaded into the L1 key directory. Note in this case the referenced memory data is not fetched from the lower levels of the memory hierarchy nor subsequently loaded into the higher levels. Then, processing returns to decisions 100 and 108 in which the comparison circuit 104 now confirms that the storage protection key is available in the L1 key cache, Then, the selection and protection checking hardware 110 determines if the request is authorized, i.e. the access-key supplied by the program matches the access control bits stored in the L1 key cache (step 120). If so (decision 122), then processing continues with decision 142 in which the L1 cache controller 29 supplies the store request, absolute address, and updated data to the L2 cache controller 30. The L2 cache controller 30, after selecting the store request for service, supplies the store request absolute address to the comparison circuit 138 and comparison circuit 140 to determine if the data is resident in the L2 data cache and if the storage protection key is resident in the L2 key cache. If the data is not resident in the L2 data cache, then steps 150 and 152 are performed to fetch the data from main memory and load the data into the L2 data cache and the absolute address into the L2 data directory. If the data is not resident in L2 data cache or the storage protection key is not resident in the L2 key cache, steps 154 and 156 are performed to fetch the access control bits, fetch- protection bit, and change bit from the storage protection key array 21 and load the information into the L2 key cache and the absolute address in the L2 key directory, if not already present. The transfer of the storage protection key fields occurs with the first data transfer, if any. Even though the key is read from the L1 key cache for the purpose of checking request authorization, the storage protection key information is needed in the L2 key cache for accesses by other processors and associated L1 data caches and L1 key caches. Processing continues with step 180, the data is updated in the proper location in the L2 data cache and the change bit is set in the L2 key cache. The store request is now complete.

It should be noted that in accordance with the objects of the present invention, for subsequent accesses to the same page, the corresponding access control bits and fetch-protection bit are now stored in the L1 key cache 26 so that key-controlled protection can be effected without delay. This is illustrated by decision 108 which leads directly to step 120 for these subsequent memory operations to the same page.

Based on the foregoing, a two level cache system including storage of storage protection keys has been disclosed according to the present invention. However, numerous modifications and substitutions can be made without deviating from the scope of the present invention. For example, although the L2 key cache is managed as a store-in cache, it may be possible to avoid a number of copy-back operations by retaining a local dirty bit to indicate if the change bit was ever altered. A second alternative is to cause the change bit of the corresponding entry in the storage protection key array to be asserted on the first transition to an asserted state in the L2 key cache, avoiding a subsequent copyback operation on replacement. Therefore, the present invention has been disclosed by illustration and not limitation, and reference should be made to the following claims to determine the scope of the present invention.

I claim:

1. A computer system comprising:
   a level one (L1) data cache;
   an L1 key cache for storing access keys for respective blocks of data;
   a level three (L3) storage;
   a level two (L2) data cache, coupled between said L3 storage and said L1 data cache; an L2 key cache for storing access keys for respective blocks of data in said L2 data cache;
   means, responsive to a request by a processor to write data into a block which is represented in said L2 data cache but not in said L1 data cache, for determining if an access key corresponding to the represented block is stored in said L1 key cache, and
   if said corresponding access key is stored in said L1 key cache, comparing said corresponding access key from said L1 key cache to an access key provided with said request, and if said request is authorized, writing the processor data into said L2 data cache but not into said L1 data cache, and
   if said corresponding access key is not stored in said L1 key cache but is stored in said L2 key cache, copying said corresponding access key from said L2 key cache to said L1 key cache and then comparing said corresponding access key from said L1 key cache to an access key provided with the request, and if said request is authorized, writing the processor data into said L2 data cache but not into said L1 data cache.

2. A computer system as set forth in claim 1 wherein one of said keys corresponds to a plurality of said blocks of data in said L1 data cache and said L2 data cache.

3. A computer system as set forth in claim 2 further comprising means for casting out one of said plurality of blocks of data from said L2 data cache to said L3 storage without casting out said one key from said L2 key cache.

4. A system as set forth in claim 1 wherein all of said keys are storage protection keys.

5. A system as set forth in claim 1 wherein all of said keys are authorization checking keys.

6. A system as set forth in claim 1 wherein said L3 storage stores data including data in said L2 data cache and stores access keys including access keys in said L2 key cache.

7. A system as set forth in claim 1 wherein said L1 data cache and said L1 key cache are dedicated to said processor.

8. A system as set forth in claim 7 further comprising:
   a second L1 data cache coupled to said L2 data cache and dedicated to a second processor; and
   a second L1 key cache, coupled to said L2 key cache and dedicated to said second processor, for storing access keys for respective blocks of data.

9. A system as set forth in claim 1 wherein said L2 key cache is coupled between said L3 storage and said L1 key cache.

10. A computer system as set forth in claim 1, wherein said L3 storage is a main memory.

11. A computer system comprising:
a first level one (L1) data cache;
a first L1 key cache for storing a first plurality of access keys for respective blocks of data;
a second L1 data cache;
a second L1 key cache for storing a second plurality of access keys for respective blocks of data;
a level three (L3) storage;
a level two (L2) data cache, coupled between said L3 storage and said L1 data caches;
an L2 key cache for storing said first and second pluralities of access keys for respective blocks of data in said L2 data cache;
means, responsive to a request by a processor associated said first L1 data cache and said first L1 key cache to write data into a block which is represented in said L2 data cache but not in said first L1 data cache, for determining if an access key corresponding to the represented block is stored in said first L1 key cache, and
if said corresponding access key is stored in said first L1 key cache, comparing said corresponding access key from said first L1 key cache to an access key provided with said request, and if said request is authorized, writing the processor data into said L2 data cache but not into said first L1 data cache, and
if said corresponding access key is not stored in said first L1 key cache but is stored in said L2 key cache, copying said corresponding access key from said L2 key cache to said first L1 key cache and then comparing said corresponding access key from said first L1 key cache to an access key provided with the request, and if said request is authorized, writing the processor data into said L2 data cache but not into said first L1 data cache.

12. A system as set forth in claim 11 further comprising:
means, responsive to a request by said processor to write data into a block which is represented in said L3 storage but not in said L2 data cache or said first L1 data cache, for copying a current contents of said block from said L3 storage to said L2 data cache but not copying said current contents from said L2 data cache to said first L1 data cache;
means for copying an access key associated with said current contents from said L3 storage to said L2 key cache and from said L2 key cache to said first L1 key cache;
means for comparing said associated access key from said first L1 key cache to an access key provided with the request; and
means for writing the processor data over said current contents in said L2 data cache if said request is authorized, but not writing the processor data into said first L1 data cache.

13. A system as set forth in claim 11 further comprising:
means, responsive to a request by said processor to read data which is stored in said L3 storage but not in said L2 data cache or said first L1 data cache, for copying said data from said L3 storage to said L2 data cache and from said L2 data cache to said first L1 data cache and copying an associated access key from said L3 storage to said L2 key cache and from said L2 key cache to said first L1 key cache;
means for comparing said associated access key from said first L1 key cache to an access key provided with the request, and if said request is authorized, transferring said data from said first L1 data cache to said processor;
means, responsive to a request by said processor to read data which is stored in said L2 data cache but not in said first L1 data cache, for copying said data from said L2 data cache to said first L1 data cache and copying the associated access key from said L2 key cache to said first L1 key cache;
means for comparing said associated access key from said first L1 key cache to an access key provided with the request; and
means for transferring said data from said first L1 data cache to said processor if said request is authorized.

14. A system as set forth in claim 11 wherein all of said keys are storage protection keys.

15. A system as set forth in claim 11 wherein all of said keys are authorization checking keys.

16. A system as set forth in claim 11 wherein said L3 storage stores data including data in said L2 data cache and stores access keys including access keys in said L2 key cache.

17. A system as set forth in claim 11 wherein said L2 key cache is coupled between said L3 storage and said L1 key cache.

18. A computer system as set forth in claim 11, wherein said L3 storage is a main memory.

* * * * *